(12) United States Patent
Petri

(10) Patent No.: US 8,055,993 B2
(45) Date of Patent: Nov. 8, 2011

(54) SELECTING AND DISPLAYING DESCENDANT PAGES

(75) Inventor: John Edward Petri, Lewiston, MN (US)

(73) Assignee: International Business Machines Corporation, Armonk, NY (US)

( * ) Notice: Subject to any disclaimer, the term of this patent is extended or adjusted under 35 U.S.C. 154(b) by 1251 days.

(21) Appl. No.: 11/558,216

(22) Filed: Nov. 9, 2006

(65) Prior Publication Data

US 2008/0115047 A1    May 15, 2008

(51) Int. Cl.
    *G06F 17/30*    (2006.01)
(52) U.S. Cl. ........ 715/205; 715/207; 715/234; 715/853; 715/854
(58) Field of Classification Search .................. 715/205, 715/207, 234, 853, 854
    See application file for complete search history.

(56) References Cited

U.S. PATENT DOCUMENTS

| | | | |
|---|---|---|---|
| 5,544,354 A * | 8/1996 | May et al. | 707/4 |
| 6,016,494 A * | 1/2000 | Isensee et al. | 1/1 |
| 6,085,229 A * | 7/2000 | Newman et al. | 709/203 |
| 6,118,493 A * | 9/2000 | Duhault et al. | 348/564 |
| 6,131,110 A * | 10/2000 | Bates et al. | 709/203 |
| 6,133,916 A * | 10/2000 | Bukszar et al. | 715/744 |
| 6,177,936 B1 * | 1/2001 | Cragun | 715/760 |
| 6,237,030 B1 * | 5/2001 | Adams et al. | 709/218 |
| 6,313,855 B1 * | 11/2001 | Shuping et al. | 715/854 |
| 6,922,815 B2 * | 7/2005 | Rosen | 715/782 |
| 7,103,642 B1 * | 9/2006 | Chen et al. | 709/218 |
| 7,490,288 B2 * | 2/2009 | Undasan | 715/201 |

OTHER PUBLICATIONS

Wu, Yu, and Ballman, SpeedTracer: A Web usage mining and analysis tool, 1998, IBM Systems Jounral , vol. 37, No. 1, 89-105.*

Ming-Syan Chen, Jong Soo Park, and Philp S. Yu, Data Mining for Path Traversal Patterns in a Web Environment, 1996, in 16th International Confiernce on Distributed Computing Systems, 385-392.*

Jaideep Srivastava, Robert Cooley, Mukund Deshpande, and Pang-Ning Tan, Web Usage Mining: Discovery and Applications of Usage Patterns from Web Data, 2000, SIGKDD Explorations, vol. 1, Issue 2, 1-12.*

Xiao Fang and Olivia R. Liu Sheng, LinkSelector: A Web Mining Approach to Hyperlink Selection for Web Portals, May 2004, ACM Trasactions on Internet Technology, vol. 4, No. 2, 209-237.*

* cited by examiner

*Primary Examiner* — Stephen S. Hong
*Assistant Examiner* — I-Chan Yang
(74) *Attorney, Agent, or Firm* — Owen J. Gamon

(57) ABSTRACT

In an embodiment, a link to a current page is received from a user. In response to receiving the link, a descendant page of the current page is selected that meets a policy associated with the domain of the current page. The current page and the descendant page are retrieved and displayed. The current page and the descendant page are simultaneously viewable. The current page and the descendant page are in the same domain. In various embodiments, the descendant page is specified by a server, by the user, or is on a most-frequently traversed path in the domain. In various embodiments, the descendant page is a terminal page on the most-frequently traversed path or is at a level on the path that is specified by the policy.

17 Claims, 8 Drawing Sheets

| | | | SITE DATA FOR USER A | | | 150-1 |
|---|---|---|---|---|---|---|
| 420 | 425 | 430 | 435 | 440 | 445 | |
| DOMAIN HOME PAGE | LINK TRAVERSAL DATA ID | POLICY DATA ID | SERVER TAGGED PAGE | USER TAGGED PAGE | PREVIEW INDICATOR | |
| PORTAL WWW..... | LINK TRAVERSAL DATA A | POLICY DATA A | NEWS WWW.... | US WWW.... | ON | 405 |
| BANK WWW... | LINK TRAVERSAL DATA B | POLICY DATA B | | | ON | 410 |
| MUSIC SERVICE WWW... | LINK TRAVERSAL DATA C | POLICY DATA C | | | OFF | 415 |
| BASKET BALL FAN WWW... | LINK TRAVERSAL DATA D | POLICY DATA D | | | OFF | 417 |

FIG. 4

LINK TRAVERSAL DATA A — 152-1

CLIENT LINK TRAVERSAL DATA — 501

| FIRST PAGE IN PATH SEGMENT (530) | SECOND PAGE IN PATH SEGMENT (535) | # OF LINK SELECTION HITS (540) | |
|---|---|---|---|
| HOME WWW... | MAIL WWW... | 25 | 505 |
| MAIL WWW... | INBOX WWW... | 25 | 510 |
| HOME WWW... | NEWS WWW... | 10 | 515 |
| NEWS WWW... | WORLD NEWS WWW... | 5 | 520 |
| HOME WWW... | SPORTS WWW... | 9 | 525 |

AGGREGATED SERVER LINK TRAVERSAL DATA — 198-1

| FIRST PAGE IN PATH SEGMENT (530) | SECOND PAGE IN PATH SEGMENT (535) | # OF LINK SELECTION HITS (540) | |
|---|---|---|---|
| HOME WWW... | MAIL WWW... | 1,000,000 | 545 |
| MAIL WWW... | INBOX WWW... | 924,000 | 550 |
| HOME WWW... | NEWS WWW... | 2,490,000 | 555 |
| NEWS WWW... | WORLD NEWS WWW... | 350,000 | 560 |
| HOME WWW... | SPORTS WWW... | 3,500,000 | 565 |
| SPORTS WWW... | BASKETBALL WWW... | 500,000 | 570 |

FIG. 5

POLICY DATA A  154-1

| PREVIEW WINDOW ID | POLICY TYPE | TRAVERSAL TYPE | TRAVERSAL LEVEL | |
|---|---|---|---|---|
| 1 | MOST FREQUENT FROM SERVER | EXACT NUMBER | 1 | 605 |
| 2 | MOST FREQUENT FROM CLIENT | COMPLETE PATH | | 610 |
| 3 | CLIENT TAGGED PAGE | | | 615 |
| 4 | SERVER TAGGED PAGE | | | 620 |

FIG. 6

SELECTING AND DISPLAYING DESCENDANT PAGES

FIELD

An embodiment of the invention generally relates to computers. In particular, an embodiment of the invention generally relates to selecting and displaying descendant pages in a preview window.

BACKGROUND

Years ago, computers were isolated devices that did not communicate with each other. But, today computers are often connected in networks, such as the Internet or World Wide Web, and a user at one computer, often called a client, may wish to access information at multiple other computers, often called servers, via a network. Information is often stored at servers and sent to the clients in units of pages, which are connected together via embedded links. A link is an address, such as a URL (Uniform Resource Locator) of a linked page that is embedded in a linking page that, when selected, causes the linked page to be retrieved. Web site domains often include multiple linked pages that were created by a single author or organization or that have related content or are part of a common topic. For example, a company that sells nails might have a web site domain with a main page that introduces the company and contains links to various other pages, such as a page that shows a map of the company's location, a page that describes the various types of nails that the company sells, and a page that describes using the nails in various applications.

Because domains may have many linked pages and every site is organized differently, a visitor to the site, especially a first-time user, may experience difficulty in determining the exact page with the information of interest to that user. But, even a user who has visited the domain frequently may experience difficulty remembering the exact page that contains the information of interest. In addition, a user who has frequently visited the domain may already have a well established usage history for the domain, and yet the user still may experience difficulty in remembering which set of links, making up particular paths, need to be traversed in order to find previously visited pages in the domain.

One current technique that attempts to address the aforementioned problems is bookmarks, also known as favorites, which allows users to save the addresses of favorite pages and then, in the future, retrieve those pages directly without searching for them or navigating through the links of a domain. Unfortunately, for bookmarks to be useful, the user must have previously visited the page and must remember to set the bookmark. Thus, bookmarks do not assist users in finding information within a domain that they have never visited before and do not assist users if they do not set the bookmark.

Thus, a better way is needed to aid users in finding and returning to pages of interest within domains.

SUMMARY

A method, apparatus, system, and signal-bearing medium are provided. A link to a current page is received from a user. In response to receiving the link, a descendant page of the current page is selected that meets a policy associated with the domain of the current page. The current page and the descendant page are retrieved and displayed and are simultaneously viewable. The current page and the descendant page are in the same domain. In various embodiments, the descendant page is specified by a server, by the user, or is on a most-frequently traversed path in the domain. In various embodiments, the descendant page is a terminal page on the most-frequently traversed path or is at a level on the path that is specified by the policy. In this way, in an embodiment, pages of interest within domains may be more easily found.

BRIEF DESCRIPTION OF THE DRAWING

FIG. 4 depicts a block diagram of example site data, according to an embodiment of the invention.

FIG. 5 depicts a block diagram of example link traversal data, according to an embodiment of the invention.

FIG. 6 depicts a block diagram of example policy data, according to an embodiment of the invention.

DETAILED DESCRIPTION

In an embodiment, a browser receives a link to a current page from a user. In response to receiving the link, the browser selects a descendant page of the current page that meets a policy that is associated with the domain of the current page and with the user. The browser retrieves the current page from a server using the link. In response to receiving the link, the browser further retrieves and displays the selected descendant page in a preview window. The current page and the descendant page in the preview window are simultaneously viewable. The current page and the descendant page are in the same domain. In various embodiments, the descendant page is specified by a server, specified by the user, or is on a most-frequently traversed path in the domain. In various embodiments, the path may be most-frequently traversed by the user that sent the link to the browser or may be most-frequently traversed by multiple users that retrieve pages from the server In various embodiments, the descendant page is a terminal page on the most-frequently traversed path or is at a level on the most-frequently traversed path that is specified by the policy.

Figure 1:
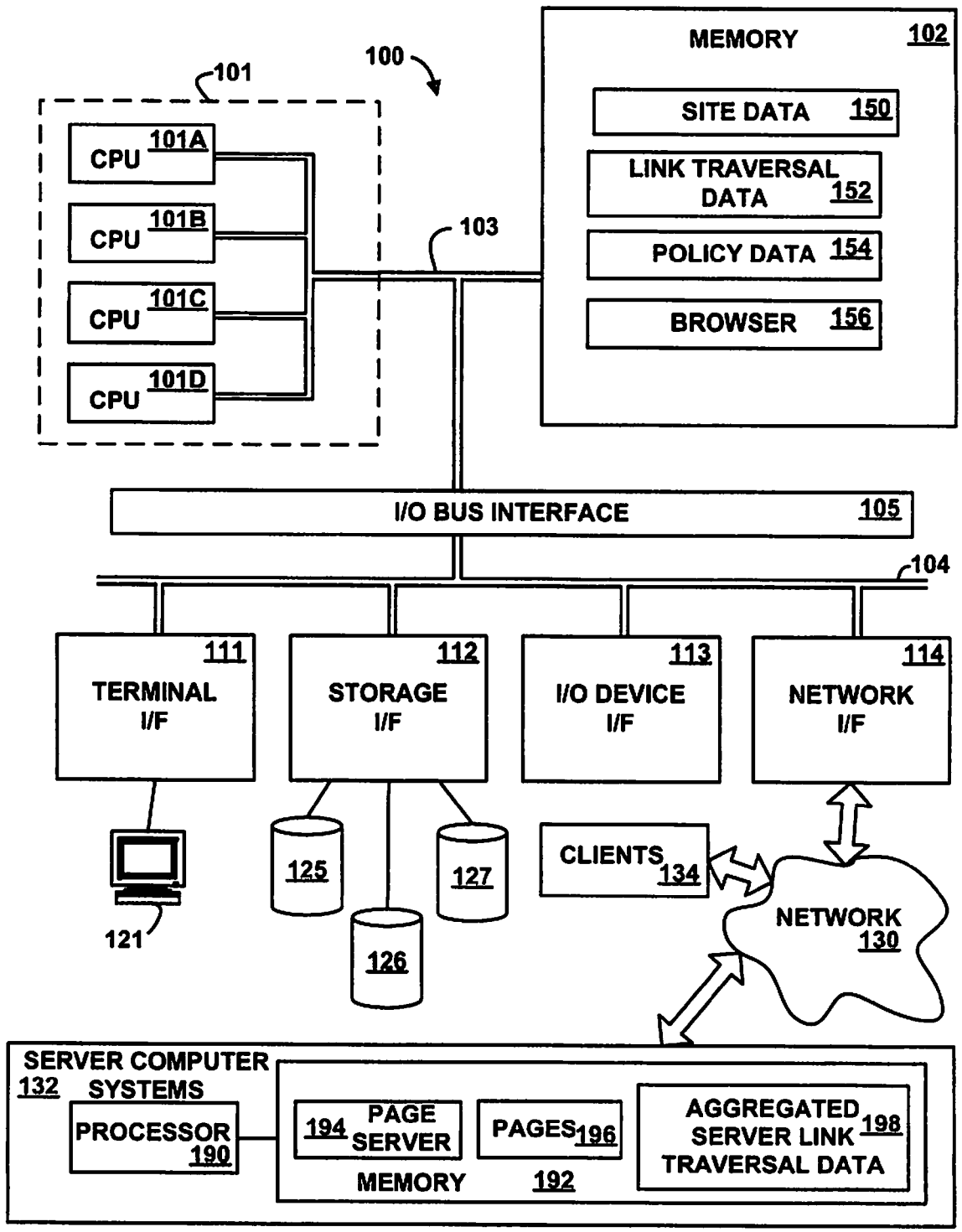
FIG. 1 depicts a block diagram of an example system for implementing an embodiment of the invention.

Referring to the Drawings, wherein like numbers denote like parts throughout the several views, FIG. 1 depicts a high-level block diagram representation of a client computer system 100 connected to server computer systems 132 and other client computer systems 134 via a network 130, according to an embodiment of the present invention. The terms "client" and "server" are used herein for convenience of exposition only, and in various embodiments a computer system that functions as a client in one embodiment may function as a server in another embodiment, and vice versa. The major components of the client computer system 100 include one or more processors 101, a main memory 102, a terminal interface 111, a storage interface 112, an I/O (Input/Output) device interface 113, and communications/network interfaces 114, all of which are coupled for inter-component communication via a memory bus 103, an I/O bus 104, and an I/O bus interface unit 105.

The client computer system 100 contains one or more general-purpose programmable central processing units (CPUs) 101A, 101B, 101C, and 101D, herein generically referred to as the processor 101. In an embodiment, the computer system 100 contains multiple processors typical of a relatively large system; however, in another embodiment the computer system 100 may alternatively be a single CPU system. Each processor 101 executes instructions stored in the main memory 102 and may include one or more levels of on-board cache.

The main memory 102 is a random-access semiconductor memory for storing data and programs. The main memory 102 is conceptually a single monolithic entity, but in other embodiments, the main memory 102 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may further be distributed and associated with different CPUs or sets of CPUs, as is known in any of various so-called non-uniform memory access (NUMA) computer architectures.

The memory 102 stores or encodes site data 150, link traversal data 152, policy data, and a browser 156. Although the site data 150, the link traversal data 152, the policy data, and the browser 156 are illustrated as being contained within the memory 102 in the computer system 100, in other embodiments some or all of them may be on different computer systems and may be accessed remotely, e.g., via the network 130. The computer system 100 may use virtual addressing mechanisms that allow the programs of the computer system 100 to behave as if they only have access to a large, single storage entity instead of access to multiple, smaller storage entities. Thus, while the site data 150, the link traversal data 152, the policy data, and the browser 156 are all illustrated as being contained within the memory 102 in the computer system 100, these elements are not necessarily all completely contained in the same storage device at the same time. Further, although the site data 150, the link traversal data 152, the policy data, and the browser 156 are illustrated as being separate entities, in other embodiments some of them, portions of some of them, or all of them may be packaged together.

The site data 150 describes information about web sites or domains from which the user at the client computer system 100 has retrieved pages via the browser 156. The site data 150 is further described below with reference to FIG. 4.

The link traversal data 152 describes traversals of paths that a user of the client computer system 100 or optionally other users have requested. A path is an alternating sequence of pages and links between the pages, and a user traverses paths by requesting the browser 156 to retrieve pages using links. The link traversal data 152 is further described below with reference to FIG. 5.

The policy data 154 specifies policies or criteria that the browser 156 uses to select pages to display in preview windows of a user interface. The policy data 154 is further described below with reference to FIG. 6.

The browser 156 receives a link that points at a page from a user interface (e.g., via selection of an embedded link in a displayed page, selection of a bookmark or favorites entry, or via text entry) and sends a request for the identified page to the correct server computer system 132. The browser 156 further selects descendant pages of the identified page based on the policy data 154, the site data 150, and the link traversal data 152, retrieves the descendant pages and displays them in a preview window simultaneously with the display of the identified page.

In various embodiments, the browser 156 may be implemented via an operating system, a user application, a third-party application, or any appropriate program encoded with executable instructions or interpretable statements for execution on the processor 101. In another embodiment, the browser 156 may implemented in hardware. In an embodiment, the browser 156 includes instructions capable of executing on the processor 101 or statements capable of being interpreted by instructions executing on the processor 101 to perform the functions as further described below with reference to FIGS. 7 and 8. In another embodiment, the browser 156 may be implemented in microcode. In another embodiment, the browser 156 may be implemented in hardware via logic gates and/or other appropriate hardware techniques in lieu of or in addition to a processor-based system.

The memory bus 103 provides a data communication path for transferring data among the processors 101, the main memory 102, and the I/O bus interface unit 105. The I/O bus interface unit 105 is further coupled to the system I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the system I/O bus 104. The system I/O bus 104 may be, e.g., an industry standard PCI (Peripheral Component Interconnect) bus, or any other appropriate bus technology. The I/O interface units support communication with a variety of storage and I/O devices. For example, the terminal interface unit 111 supports the attachment of one or more user terminals 121. The user terminals 121 may include a user output device, such as a video display device, a speaker, any other user output device, or any combination or multiple thereof. The user terminals 121 may include a user input device, such as a keyboard, mouse, trackball, track pad, other pointing device, any other user output device, or any combination or multiple thereof.

The storage interface unit 112 supports the attachment of one or more direct access storage devices (DASD) 125, 126, and 127, which are typically rotating magnetic disk drive storage devices, although they could alternatively be other devices, including arrays of disk drives configured to appear as a single large storage device to a host. The contents of the DASD 125, 126, and 127 may be loaded from and stored to the memory 102 as needed. The storage interface unit 112 may also support other types of devices, such as a diskette device, a tape device, an optical device, or any other type of storage device.

The I/O device interface 113 provides an interface to any of various other input/output devices or devices of other types, such as a printer, fax machine, or any other device.

The network interface 114 provides one or more communications paths from the computer system 100 to other digital devices and computer systems; such paths may include, e.g., one or more networks 130. In various embodiments, the network interface 114 may be implemented via a modem, a LAN (Local Area Network) card, a virtual LAN card, or any other appropriate network interface or combination of network interfaces.

Although the memory bus 103 is shown in FIG. 1 as a relatively simple, single bus structure providing a direct communication path among the processors 101, the main memory 102, and the I/O bus interface 105, in fact the memory bus 103 may comprise multiple different buses or communication paths, which may be arranged in any of various forms, such as point-to-point links in hierarchical, star or web configurations, multiple hierarchical buses, parallel and redundant paths, etc. Furthermore, while the I/O bus interface 105 and the I/O bus 104 are shown as single respective units, the computer system 100 may in fact contain multiple I/O bus interface units 105 and/or multiple I/O buses 104. While multiple I/O interface units are shown, which separate the system I/O bus 104 from various communications paths running to the various I/O devices, in other embodiments some or all of the I/O devices are connected directly to one or more system I/O buses.

In various embodiments, the client computer system 100 may be a multiple-user computer, such as a mainframe computer, a single-user computer, or a server that has little or no direct user interface, but receives requests from other computer systems (clients). In other embodiments, the client computer system 100 may be implemented as a firewall, router, Internet Service Provider (ISP), personal computer, portable computer, laptop or notebook computer, PDA (Personal Digital Assistant), tablet computer, pocket computer, telephone, pager, automobile, teleconferencing system, appliance, or any other appropriate type of electronic device.

The network 130 may be any suitable network or combination of networks and may support any appropriate protocol suitable for communication of data and/or code to/from the computer systems 100, 132, and 134. In various embodiments, the network 130 may represent a storage device or a combination of storage devices, either connected directly or indirectly to the computer systems. In an embodiment, the network 130 may support the Infiniband architecture. In another embodiment, the network 130 may support wireless communications. In another embodiment, the network 130 may support hard-wired communications, such as a telephone line or cable. In another embodiment, the network 130 may support the Ethernet IEEE (Institute of Electrical and Electronics Engineers) 802.3x specification. In another embodiment, the network 130 may be the Internet and may support IP (Internet Protocol). In another embodiment, the network 130 may be a local area network (LAN) or a wide area network (WAN). In another embodiment, the network 130 may be a hotspot service provider network. In another embodiment, the network 130 may be an intranet. In another embodiment, the network 130 may be a GPRS (General Packet Radio Service) network. In another embodiment, the network 130 may be a FRS (Family Radio Service) network. In another embodiment, the network 130 may be any appropriate cellular data network or cell-based radio network technology. In another embodiment, the network 130 may be an IEEE 802.11B wireless network. In still another embodiment, the network 130 may be any suitable network or combination of networks. Although one network 130 is shown, in other embodiments any number of networks (of the same or different types) may be present.

The server computer systems 132 include memory 192 connected to a processor 190. The memory 192 stores or encodes a page server 194, multiple pages 196, and aggregated server link traversal data 198. The page server 194 may include instructions capable of executing on the processor 190 to perform the functions as further described below with reference to FIGS. 7 and 8. The pages 196 may be implemented as files, records, or packets and may include embedded links, text, images, audio data, video data, control tags, format specifications, statements, instructions, or any multiple or combination thereof. The pages 196 are further described below with reference to FIG. 2. The aggregated server link traversal data 198 describes path traversal of the pages 196 via retrieval of the pages 196 by multiple users at the client 100 and/or the clients 134. The server computer systems 132 may further include some or all of the software and/or hardware components previously described above as being included in the client computer system 100.

The client computer systems 134 may include some or all of the hardware components previously described above as being included in the client computer system 100. The client computer systems 134 may also retrieve selected pages 196 from the server computer systems 132.

It should be understood that FIG. 1 is intended to depict the representative major components of the computer systems 100, 132, and 134 and the network 130 at a high level, that individual components may have greater complexity than represented in FIG. 1, that components other than, fewer than, or in addition to those shown in FIG. 1 may be present, and that the number, type, and configuration of such components may vary. Several particular examples of such additional complexity or additional variations are disclosed herein; it being understood that these are by way of example only and are not necessarily the only such variations.

The various software components illustrated in FIG. 1 and implementing various embodiments of the invention may be implemented in a number of manners, including using various computer software applications, routines, components, programs, objects, modules, data structures, etc., referred to hereinafter as "computer programs," or simply "programs." The computer programs typically comprise one or more instructions that are resident at various times in various memory and storage devices in the computer systems 100, 132, and 134 and that, when read and executed by one or more processors in the computer systems, cause the computer systems to perform the steps necessary to execute steps or elements embodying the various aspects of an embodiment of the invention.

Moreover, while embodiments of the invention have and hereinafter will be described in the context of fully functioning computer systems, the various embodiments of the invention are capable of being distributed as a program product in a variety of forms, and the invention applies equally regardless of the particular type of signal-bearing medium used to actually carry out the distribution. The programs defining the functions of this embodiment may be delivered to the computer system 100 via a variety of tangible signal-bearing media that may be operatively or communicatively connected (directly or indirectly) to the processor 101. The signal-bearing media may include, but are not limited to:

(1) information permanently stored on a non-rewriteable storage medium, e.g., a read-only memory device attached to or within a computer system, such as a CD-ROM readable by a CD-ROM drive;

(2) alterable information stored on a rewriteable storage medium, e.g., a hard disk drive (e.g., DASD 125, 126, or 127), CD-RW, or diskette; or (3) information conveyed to the computer system 100 by a communications medium, such as through a computer or a telephone network, e.g., the network 130.

Such tangible signal-bearing media, when encoded with or carrying computer-readable and executable instructions that direct the functions of the present invention, represent embodiments of the present invention.

Embodiments of the present invention may also be delivered as part of a service engagement with a client corporation, nonprofit organization, government entity, internal organizational structure, or the like. Aspects of these embodiments may include configuring a computer system to perform, and deploying software systems and web services that implement, some or all of the methods described herein. Aspects of these embodiments may also include analyzing the client company, creating recommendations responsive to the analysis, generating software to implement portions of the recommendations, integrating the software into existing processes and infrastructure, metering use of the methods and systems described herein, allocating expenses to users, and billing users for their use of these methods and systems.

In addition, various programs described hereinafter may be identified based upon the application for which they are implemented in a specific embodiment of the invention. But, any particular program nomenclature that follows is used merely for convenience, and thus embodiments of the invention should not be limited to use solely in any specific application identified and/or implied by such nomenclature.

The exemplary environments illustrated in FIG. 1 are not intended to limit the present invention. Indeed, other alternative hardware and/or software environments may be used without departing from the scope of the invention.

Figure 2:
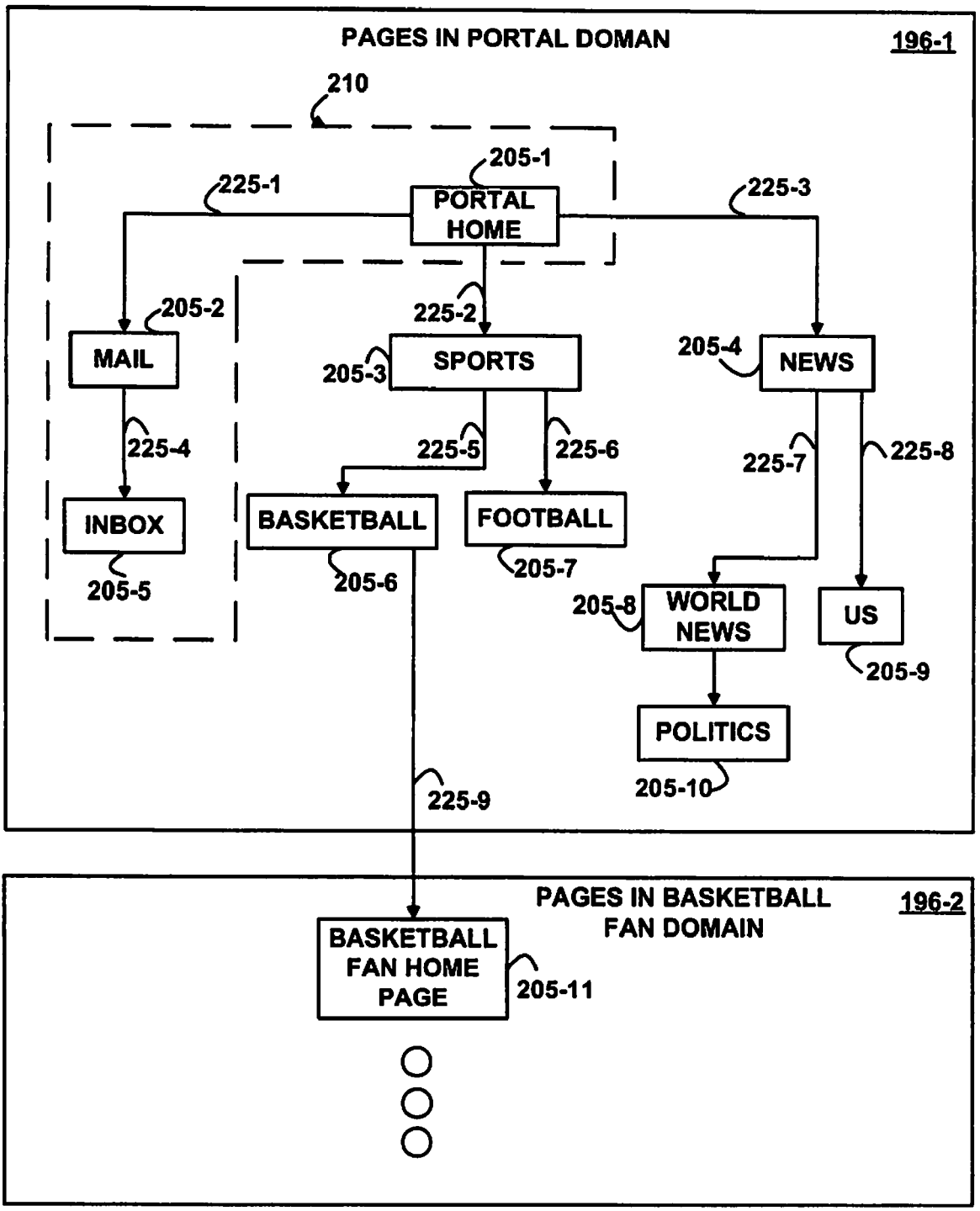
FIG. 2 depicts a block diagram of example pages, according to an embodiment of the invention.

FIG. 2 depicts a block diagram of example pages 196-1 and 196-2, according to an embodiment of the invention. The example pages 196-1 represent a domain that includes pages 205-1, 205-2, 205-3, 205-4, 205-5, 205-6, 205-7, 205-8, 205-9, and 205-10, whose organization may be represented as a graph. The pages 196 and 196-1 generically refer to the pages 205-1, 205-2, 205-3, 205-4, 205-5, 205-6, 205-7, 205-8, 205-9, and/or 205-10. The example pages 196-2 represent a domain that includes page 205-11, whose organization may be represented as a graph. The pages 196 and 196-2 generically refer to the page 205-11.

In general, a graph includes sets of nodes and edges. The nodes (also called vertices) represent objects or data, and the edges represent the links between the pages. An edge connects two nodes, and these two nodes are referred to as incident to that edge; equivalently, that edge is incident to those two nodes. The edges may have a direction, in which case the edges are called directed edges. If a direction of an edge is away from a first node and toward a second node, the first node is said to be the parent node of the second node, which is the child node of the first node.

One type of a graph is a tree, which represents a hierarchical organization of linked data. A tree takes its name from an analogy to trees in nature, which have a hierarchical organization of branches and leaves. For example, a leaf is connected to a small branch, which further is connected to a large branch, and all branches of the tree have a common starting point at the root. Analogously, in an embodiment where the graph is a tree, the nodes have a hierarchical organization, in that a node has a relationship with another node, which itself may have a further relationship with other nodes, and so on. Thus, all of the nodes can be divided up into sub-groups and groups that ultimately all have a relationship to a root node.

To define a tree more formally, a tree structure defines the hierarchical organization of nodes, which can represent any data. Hence, a tree is a finite set, T, of one or more of the nodes, such that a) one specially designated node is called the root of the tree; and b) the remaining nodes (excluding the root) are partitioned into m>=0 disjoint sets $T_1, \ldots T_m$, and each of these sets is in turn a tree.

The trees $T_1, \ldots, T_m$ are called the subtrees of the root. Thus, every node in a tree is the root of some subtree contained in the whole tree. The number of subtrees of a node is called the degree of that node. A node of degree zero is called a terminal node or a leaf. A non-terminal node is called a branch node. The level of a node with respect to T is defined by saying that the root has level 0, and other nodes have a level that is one higher than they have with respect to the subtree that contains them. Each root is the parent of the roots of its subtrees, and the latter are siblings, and they are also the children of their parent. The nodes in the subtrees of a root are the root's descendants. The root of the entire tree has no parent.

A different definition of a tree defines a tree as a connected acyclic simple graph. A simple graph has no multiple edges that share the same end nodes. An acyclic graph contains no cycles, where a cycle is a closed walk.

A walk is an alternating sequence of a subset of the nodes and edges of the graph, beginning with a first-node and ending with a last-node, in which each node in the walk is incident to the two edges that precede and follow it in the sequence, and the nodes that precede and follow an edge are the end-nodes of that edge. The walk is said to be closed if its first-node and last-node are the same or open if its first-node and last-node are different. An open walk is also called a path. In various embodiments, all of the edges in the walk may be different or distinct (in which case the walk is also known as a trail), or some of the edges in the walk may be the same. A walk may be formed from any type of the graph.

Thus, in the example of FIG. 2, the organization of the linked pages 196-1 may be represented by a graph, in which case the nodes may represent the pages, and each directed edge represents a link (an embedded partially or fully-qualified URL or address) from one page to another page.

For example, the page 205-1 is the root page of the entire tree of the pages 196-1. The page 205-1 includes embedded child links 225-1, 225-2, and 225-3, which point to the respective child pages 205-2, 205-3, and 205-4. The pages 205-2, 205-3, and 205-4 are descendants of their parent page, which is the root page 205-1. The page 205-2 includes an embedded child link 225-4, which points to its child page 205-5. The page 205-5 is a descendant of its parent page 205-2 and the root page 205-1.

The page 205-3 includes embedded child links 225-5 and 225-6 that point to its child pages 205-6 and 205-7. The pages 205-6 and 205-7 are descendants of their parent page 205-3 and of the page 205-1. The page 205-4 includes embedded child links 225-7 and 225-8 that point to its respective child pages 205-8 and 205-9. The pages 205-8 and 205-9 are descendants of their parent page 205-4 and of the page 205-1. The page 205-8 includes an embedded child link that points at its child page 205-10. The page 205-10 is a descendant of its parent page 205-8, the page 205-4, and of the page 205-1.

The page 205-6 includes an embedded child link 225-9, which points at its child page 205-11, which is in a different domain than the page 205-6. The page 205-11 is a descendant of its parent page 205-6, the page 205-3, and of the page 205-1.

The graph of the pages 196-1 includes an example path 210, which is a sequence of the page 205-1, the embedded child link 225-1 from the page 205-1 to the page 205-2, the page 205-2, the embedded child link 225-4 from the page 205-2 to the page 205-5, and the page 205-5. The pages 205-2 and 205-5 in the path 210 are descendant pages of the root page 205-1. The path 210 represents a way for a user that is viewing the page 205-1 to find the descendant page 205-5. That is, the user traverses the path 205-1 by requesting the browser 156 to retrieve the page 205-1, requesting the browser 156 to retrieve the page 205-2 pointed at by the link 225-1 embedded in the page 205-1, and by requesting the browser 156 to retrieve the page 205-5 via the link 225-4 embedded in the page 205-2.

Stated more generally, a path is composed of an alternating sequence of a subset of pages and links. Each of the links in the alternating sequence is incident to two of the pages that precede and follow the respective link in the alternating sequence. Each link in the alternating sequence is embedded in a parent page and points at a child page. To traverse the path, a user selects links in the alternating sequence, which causes the browser 156 to submit a request to the page server 194 to retrieve the child page in the alternating sequence that is pointed at by the selected link.

The root page 205-1 is located at level zero in the path 210. The page 205-2 is located at level one in the path 210. The page 205-5 is at level two in the path 210. Although the pages 196-1 are illustrated as a tree, in other embodiments, the pages may take the form of a graph, and any page may link to any other page. The page 205-5 is a terminal page in the path 210 within the domain of the pages 196-1. The pages 205-6, 205-7, 205-9, and 205-10 are also terminal pages in their respective paths within the domain of the pages 196-1. The page 205-6 is a terminal page in its domain because its only embedded child link points at the page 205-11, which is in a different domain than its parent page 205-6.

The links 225-1, 225-2, 225-3, 225-4, 225-5, 225-6, 225-7, 225-8, and 225-9 may be addresses, pointers, or page identifiers that define a route to or point at a page on the server. In an embodiment, a link is a URL (Uniform Resource Locator), but in other embodiments any appropriate protocol or format may be used. To access and retrieve a page, a user may enter a link into a browser 156 via text entry (e.g., via a keyboard), may select a saved link from a bookmark or favorites list, or may select a child link that is embedded into a page via a mouse or other pointing device, e.g., by moving a mouse pointer over a displayed embedded link and clicking a mouse button, which sends a selection of the link to the browser 156 that displayed the page. In an embodiment, a link includes an access protocol, a domain name, and optionally a path (directory, subdirectory, and page name) to a particular page residing on the server 132. The browser 156 or the page server 194 may optionally supply one or more default components of the URL. For example, the browser 156 may add a default protocol prefix, port number, and a portion of the domain name if they are not supplied by the user. As another example, the page server 194 may find and send a default page called a "home page" to the browser 156 if the URL that the page server 194 receives from the browser 156 does not include a directory or file name.

The root page 205-1 represents the home page of a domain, which the graph of the pages 196-1 represents. A domain is a group of one or more computers and/or other devices on a network that are administered as a unit and share a common network address, e.g., an IP (Internet Protocol address). A network address is an identifier (typically a numeric identifier) for a computer or device on the network 130. Network addresses are usually assigned to domain names, which are textual names that are easier to remember than the numeric network addresses. An example domain name is www.ibm.com. The page 205-11 represents the home page of another domain, which the graph of the pages 196-2 represents.

Figure 3:
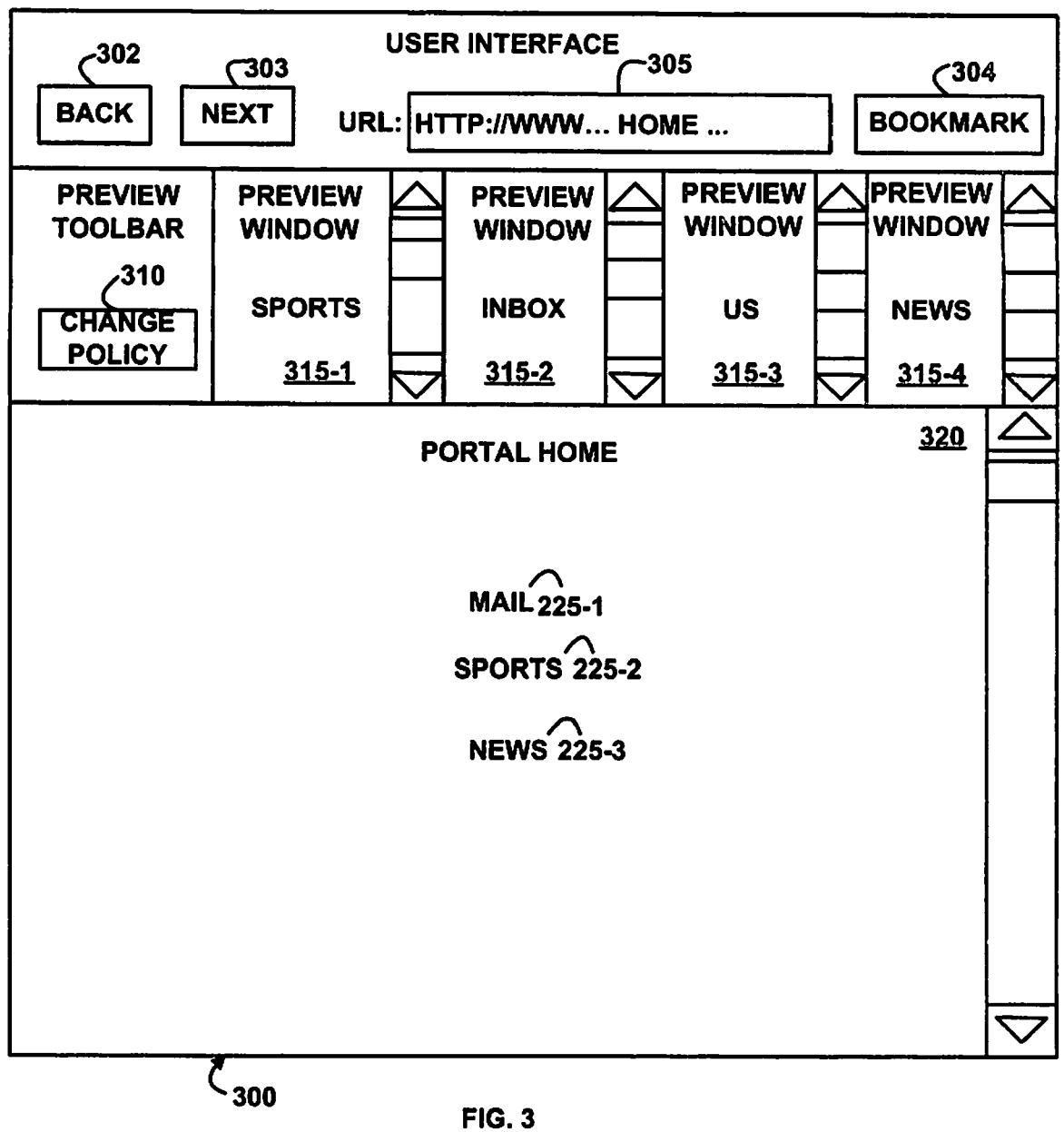
FIG. 3 depicts a block diagram of an example user interface, according to an embodiment of the invention.

FIG. 3 depicts a block diagram of an example user interface 300, according to an embodiment of the invention. The browser 156 displays the user interface 300 via the terminal 121. The user interface 300 includes a back button 302, a next button 303, a bookmark 304, a current page link 305, a change policy button 310, preview windows 315-1, 315-2, 315-3, 315-4, and a current window 320. In response to selection of the change policy button 310, the browser 156 allows the user to enter or change the policy data 154.

The current page link 305 identifies the current page that the browser 156 retrieves from the server computer system 132, renders or formats, and displays in the current window 320. The browser 156 displays the current page link 305 in response to text entry by a user (e.g., via a keyboard), in response to a selection from the bookmark 304, in response to a selection of a page from a history of pages that the browser 156 previously retrieved (e.g., in response to selection of the back button 302 or the next button 303), or in response to selection of an embedded link in a parent page that points to the child page identified by the current page link 305.

In response to receiving the current page link 305, the browser 156 retrieves the page (e.g., the page 205-1) identified by the current page link 305 from the server computer system 132, renders or formats the current page as specified by any format or control tags or statements in the current page, and displays the rendered current page in the current window 320.

The page 205-1 (FIG. 2) displayed in the current window 320 includes the embedded child links 225-1, 225-2, and 225-3. The embedded child link 225-1 points at the page 205-2 (FIG. 2). The child embedded link 225-2 points at the page 205-3 (FIG. 2). The embedded child link 225-3 points at the page 205-4 (FIG. 2).

In response to receiving the current link 305, the browser 156 selects a number of descendant pages of the current page 305, retrieves the selected descendant pages, and renders and displays the retrieved descendant pages in the preview windows 315-1, 315-2, 315-3, and 315-4, which are simultaneously viewable with the current page displayed in the current window 320. The current window 320, and the preview windows 315-1, 315-2, 315-3, and 315-4 may have scroll bars, in case the current page and the descendant pages are too large to allow simultaneous viewing of the entire contents of the page. But, at least a portion of the current page and the descendant pages are simultaneously viewable.

FIG. 4 depicts a block diagram of example site data 150-1, according to an embodiment of the invention. The site data 150-1 is an example of the site data 150 (FIG. 1). The example site data 150-1 includes example records 405, 410, 415, and 417, each of which includes a domain home page identifier field 420, a link traversal data identifier field 425, a policy data identifier field 430, a server tagged page identifier field 435, a user tagged page identifier field 440, and a preview indicator 445. Each of the records 405, 410, 415, and 417 is associated with a root page of a particular web site or domain. The domain home page identifier field 420 specifies a link that identifies or points at the root, home page, or main page of the domain. In an embodiment, the domain home page identifier field 420 specifies a URL, but in other embodiments any appropriate link, address, or identifier, whether fully or partially qualified, may be used.

The link traversal data identifier field 425 specifies the link traversal data that is assigned to the domain home page identifier 420 in the same record. Each domain home page identifier 420 in each record 405, 410, 415, and 417 may have a different version of the link traversal data. For example, the record 405 specifies that the link traversal data 425 that is associated with the portal domain home page (the root page 205-1) is the "link traversal data A," which is further described below with reference to FIG. 5.

The policy data identifier field 430 specifies the policy data 154 that is assigned to the domain home page identifier 420. Each domain home page identifier 420 in each record 405, 410, 415, and 417 may have a different version of the policy data 154. For example, the record 405 specifies that the policy data 430 that is associated with the portal site domain home page (the root page 205-1) is the "policy data A," which is further described below with reference to FIG. 6.

The server tagged page 435 specifies a particular page that the server computer system 132 (e.g., the page server 194 acting in response to a command from a user associated with the page) has tagged, indicated, or requested to be displayed in a preview window, such as one of the preview windows 315-1, 315-2, 315-3, or 315-4. In response to retrieving a page that matches the domain home page identifier 420, the browser 156 retrieves the page specified by the server tagged page 435 and displays the server tagged page 435 in the preview window specified by the policy data 430 if allowed by the preview indicator 445 and the policy data 154 that is specified by the policy data identifier 430.

The user tagged page 440 specifies a particular page that the browser 156, acting in response to a command from a user, has tagged, indicated, or requested to be displayed in a preview window, such as one of the preview windows 315-1, 315-2, 315-3, or 315-4 if the user visits the associated domain home page 420. In response to retrieving a page that matches the domain home page identifier 420, the browser 156 retrieves the page specified by the user tagged page 440 and displays the user tagged page 440 in a preview window if allowed by the preview indicator 445 and the policy data 154 that is specified by the policy data identifier field 430.

The preview indicator 445 specifies whether or not the retrieval and display of descendant pages is allowed, in response to retrieving a page whose link matches the domain home page identifier 420.

FIG. 5 depicts a block diagram of example link traversal data 152-1 for a domain, according to an embodiment of the invention. The link traversal data 152-1 includes example client link traversal data 501 and aggregated server link traversal data 198-1.

The client link traversal data 501 represents the number of times that the user associated with the client computer system 100 has traversed various path segments of paths in a domain. In an embodiment, the client may have different client link traversal data associated with different domains from which the client has retrieved pages and traversed links. The client link traversal data 501 includes example records 505, 510, 515, 520, and 525, each of which includes a first page in path segment field 530, a second page in path segment field 535, and a number of link selection hits field 540. The first page in path segment field 530 specifies the beginning or starting page of a path segment that includes an embedded link. The second page in path segment field 535 specifies the ending page of the path segment that is pointed at by an embedded link in the first page 530. The number of link selection hits field 540 specifies a count of the number of times that the user traversed the path segment represented by the record by selecting the embedded link in the first page 530, in order to retrieve the second page 535.

Each record 505, 510, 515, 520, and 525 represents a count of the number of times 540 that the user has traversed a segment of a path in the domain associated with the client link traversal data 501. That is, each record represents the number of times 540 that a user has selected a link (e.g., via selection of a link 225-1, 225-2, or 225-3 using a mouse or other pointing device while the user interface 300 is displayed on the terminal 121) in the first page 535 that points at the second page 535, which caused the browser 156 to retrieve, render, and display the second path 535. Thus, the combination of the first page 530, the second page 535 and the embedded link between them is a path segment, and the selection of the embedded link and retrieve of the second page 535 is a traversal of the path segment.

The record 505 represents a number of times that the user traversed the path segment represented by the page 205-1, the embedded link 225-1, and the page 205-2. The record 510 represents a number of times that the user traversed the path segment represented by the page 205-2, the embedded link 225-4, and the page 205-5. The record 515 represents a number of times that the user traversed the path segment represented by the page 205-1, the embedded link 225-3, and the page 205-4. The record 520 represents a number of times that the user traversed the path segment represented by the page 205-4, the embedded link 225-7, and the page 205-8. The record 525 represents a number of times that the user traversed the path segment represented by the page 205-1, the embedded link 225-2, and the page 205-3. The client link traversal data 501 does not include a record representing traversals of the path segment from the page 205-6 to the page 205-11 via selection of the link 225-9 because the pages 205-6 and 205-11 are in different domains.

The aggregated server link traversal data 198-1 (generically referred to by the aggregated server link traversal data 198 of FIG. 1) represents the number of times that multiple users possibly associated with multiple client computer systems 100 and 134 have traversed various path segments of a domain hosted by the server computer system 132 that creates and provides the aggregated server link traversal data 198-1. The aggregated server link traversal data 198-1 includes example records 545, 550, 555, 560, 565, and 570, each of which includes a first page in path segment field 530, a second page in path segment field 535, and a number of link selection hits field 540. The first page in path segment field 530 specifies the beginning or starting page of a path segment that includes an embedded link. The second page in path segment field 535 specifies the ending page of the path segment that is pointed at by the embedded link of the first page 530. The number of link selection hits field 540 in the aggregated server link traversal data 198-1 specifies a count of the number of times that the multiple users at the client computer systems 100 and 134 traversed the path segment.

Each record 545, 550, 555, 560, and 565 represents an aggregated count of the number of times 540 that multiple users have traversed a segment of a path. That is, each record represents the sum of the number of times that multiple users have selected a link (e.g., via selection of a link 225-1, 225-2, or 225-3 using a mouse or other pointing device while the user interface 300 is displayed on a) in the first page 530 that points at the second page 535, which caused the browser to retrieve, render, and display the second page 535.

The record 545 represents a number of times that the users traversed the path segment represented by the page 205-1, the embedded link 225-1, and the page 205-2. The record 550 represents a number of times that the users traversed the path segment represented by the page 205-2, the embedded link 225-4, and the page 205-5. The record 555 represents a number of times that the users traversed the path segment represented by the page 205-1, the embedded link 225-3, and the page 205-4. The record 560 represents a number of times that the users traversed the path segment represented by the page 205-4, the embedded link 225-7, and the page 205-8. The record 565 represents a number of times that the users traversed the path segment represented by the page 205-1, the embedded link 225-2, and the page 205-3. The record 570 represents a number of times that the users traversed the path segment represented by the page 205-3, the embedded link 225-5, and the page 205-6.

FIG. 6 depicts a block diagram of example policy data 154-1, according to an embodiment of the invention. The policy data 154 (FIG. 1) generically refers to the policy data

154-1. The policy data 154-1 represents preview policies that the browser 156 uses to determine the page that the browser 156 displays in the preview windows 315-1, 315-2, 315-3, and 315-4 if the current page is the portal home page 205-1. The policy data 154-1 includes example records 605, 610, 615, and 620, each of which includes an example preview window identifier field 625, a policy type field 630, a traversal type field 640, and a traversal level field 645.

The preview window identifier field 625 identifies one of the preview windows 315-1, 315-2, 315-3, or 315-4 of FIG. 3. Thus, each record is associated with a particular preview window, e.g., the record 605 specifies a policy for the preview window 315-1, the record 610 specifies a policy for the preview window 315-2, the record 615 specifies a policy for the preview window 315-3, and the record 620 specifies a policy for the preview window 315-4.

The policy type field 630 specifies a type of preview policy for the preview window 625, which is a selection criteria that the browser 156 uses to select the descendant page to display in the associated preview window. Examples of policy types include selecting the descendant page that is on a path that multiple users have most-frequently traversed (record 605), selecting the descendant page that is on a path that the user associated with the browser 156 at the client computer system 100 has most frequently traversed (record 610), selecting the page specified by the user tagged page field 440 in the record in the site data associated with the domain (record 615), or selecting the page specified by the server tagged page field 435 in the site data associated with the domain (record 620).

The traversal type field 640 specifies a technique for selecting a descendant page of the domain home page 420 on a path from the domain home page 420 to the descendant page. A traversal type 640 of exact number (record 605) instructs the browser 156 to select the descendant page on the most-frequently traversed path at the exact traversal level 645. A traversal type of complete path (record 610) instructs the browser 156 to select the terminal descendant page on the most-frequently traversed complete path (the complete path that is specified by the client link traversal data 505 or the aggregated server link traversal data 198). A descendant page is on a complete path if the descendant page has degree zero and thus is the terminal page, a terminal node, or a leaf of the graph.

Figure 7:
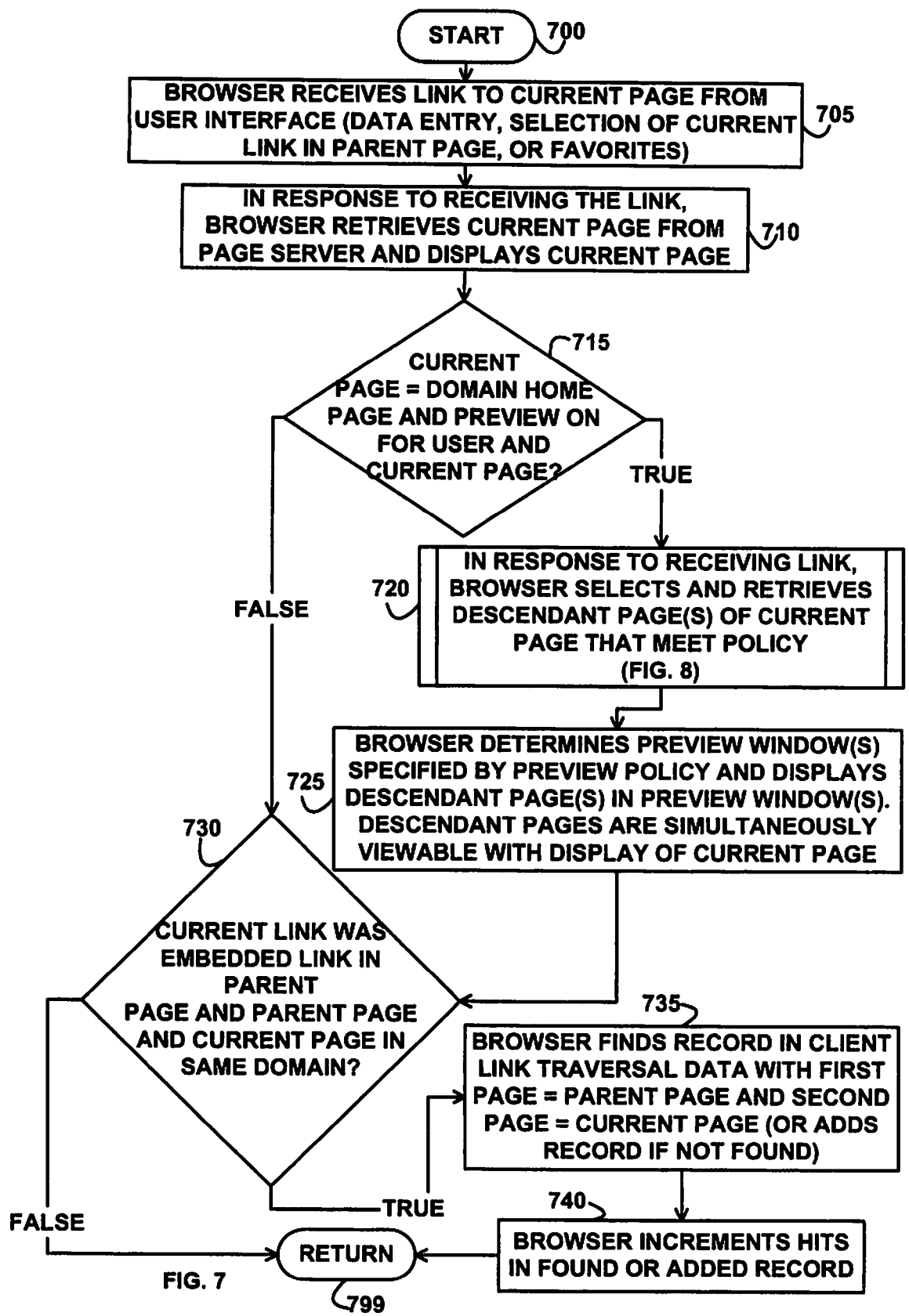
FIG. 7 depicts a flowchart of example processing for displaying descendant pages in preview windows, according to an embodiment of the invention.

FIG. 7 depicts a flowchart of example processing for displaying descendant pages of domain home pages in preview windows, according to an embodiment of the invention. Control begins at block 700.

Control then continues to block 705 where the browser 156 receives a current link that points at a current page from a user and a request to retrieve the current page. Control then continues to block 710 where, in response to receiving the current link and the request, the browser 156 retrieves the current page from the page server 194, renders or formats the current page, and displays the current page in the current window 320 via the terminal 121. Control then continues to block 715 where the browser 156 finds the site data 150 that is associated with the user that sent the current link that points at the current page. For example, the site data 150-1 is associated with "user A." The browser 156 further determines whether the current page is identical to, or matches, a domain home page 420 in the site data 150 that is associated with the user that sent the request and the current link. The browser 156 further determines whether the preview indicator 445 in the record associated with the current page (the domain home page) and the user specifies that descendant pages are permitted to be displayed in a preview window.

Figure 8:
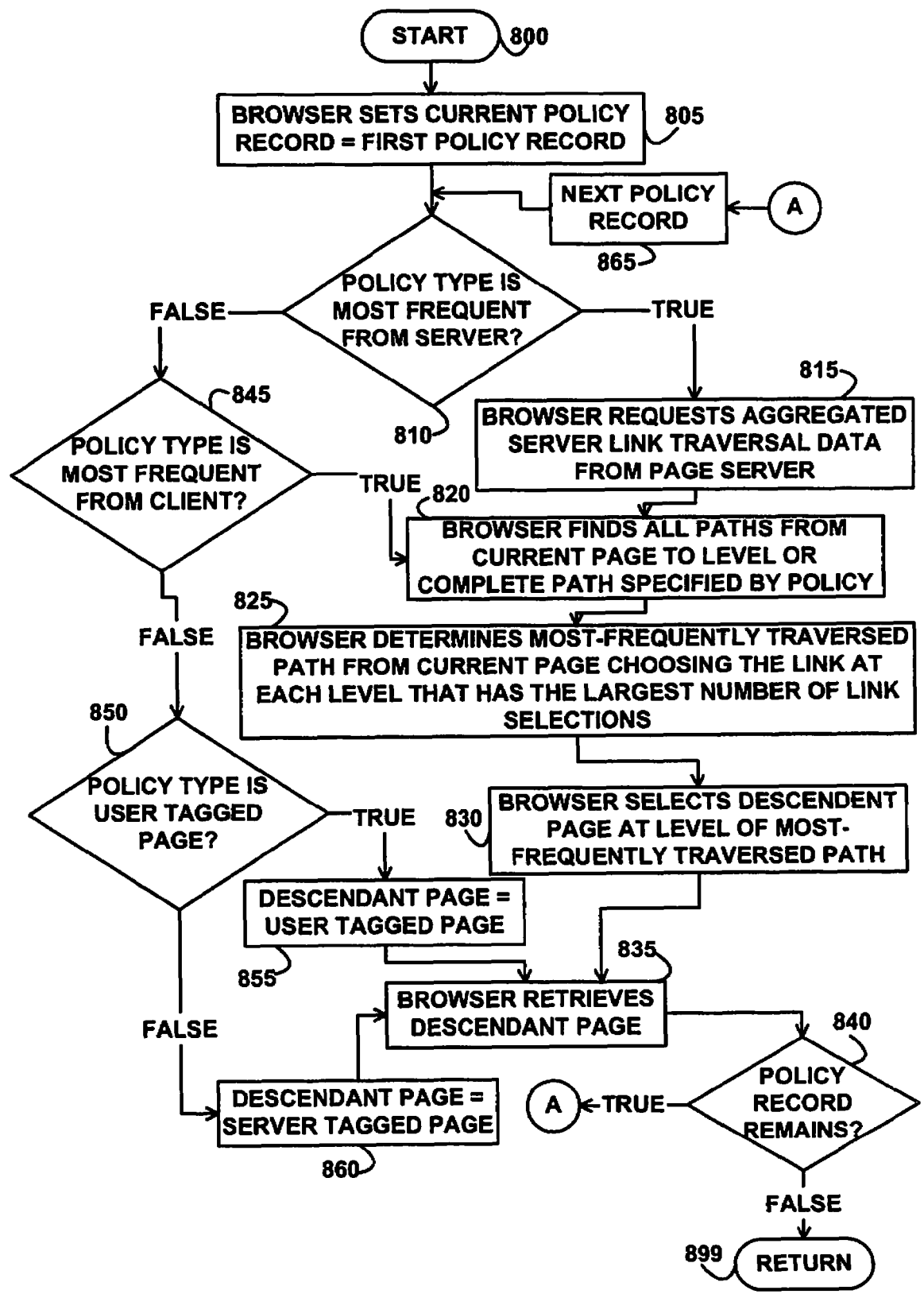
FIG. 8 depicts a flowchart of example processing for selecting descendant pages that meet a policy, according to an embodiment of the invention.

If the determination at block 715 is true, then the current page is a domain home page 420 and displaying preview pages is allowed for the domain home page 420, so control continues to block 720 where, in response to receiving the current link that points at the current page, the browser 156 selects and retrieves descendant page(s) of the current page that meets a policy specified by the policy data 154 that is associated with or assigned to the user and the domain home page (the current page), as further described below with reference to FIG. 8.

Referring again to FIG. 7, control then continues to block 725 where the browser 156 finds the policy data 154 specified by the policy data identifier 430 that is associated with the user and the domain home page. The browser 156 further determines the preview window (e.g., the preview window (315-1, 315-2, 315-3, or 315-4) that is associated with the descendant window(s) (previously selected and retrieved as described by block 720), renders the descendant page(s), and displays the descendant page(s) in the determined preview window(s). The descendant page(s) and the current page are simultaneously viewable in their respective preview windows 315-1, 315-2, 315-3 or 315-4 and the current window 320.

Control then continues to block 730 where the browser 156 determines whether the current link was received as a result of selection by a user of a child link embedded in a parent page of the current page and whether the parent page and the current page are within the same domain. The browser 156 may determine whether the parent page and the current page are within the same domain by comparing the domain name of the parent page to the domain name of the current page. In another embodiment, the browser 156 may determine whether the parent page and the current page are within the same domain by comparing the network address (e.g., the IP address) of the parent page to the network address of the current page. That is, the browser 156 determines whether the parent page was displayed at the terminal 121, and the user selected a link embedded in the parent page, which resulted in the browser 156 receiving the link that points at the current page and the parent page and the current page are hosted by the same domain. If the parent page and the current are hosted by the same domain, then the domain names (or network addresses) of the link to the parent page and of the link to the current page match or are identical.

If the determination at block 730 is true, then the link that points at the current page was received as a result of selection by a user of a link embedded in a parent page of the current page and the receipt of the current link that points at the current page and display of the current page (previously described at block 710) represents a traversal of a path segment in a path that is within a single domain, so control continues to block 735 where the browser 156 finds a record in the client link traversal data 501 with a first page 530 with contents that matches the link to the parent page a second page 535 with contents that matches the link to the current page. That is, the browser 156 finds a record in the client link traversal data 501 that represents the path segment that the user traversed by requesting the browser 156 to retrieve the page pointed at by the embedded link. If the record is not found, the browser 156 adds a new record to the client link traversal data 501, sets the first page 530 to specify the parent page, sets the second page 535 to specify the current page, and sets the number of link selection hits 540 to zero.

Control then continues to block 740 where the browser 156 increments the number of link selection hits 540 in the client link traversal data 501 by one, which represents one more traversal of the path segment represented by the record (or the first traversal if the record was newly created by block 735).

Thus, the browser 156 counts the number of requests for each selection of each link in the alternating sequence of pages and links that make up a path within a single domain. Control then continues to block 799 where the logic of FIG. 7 returns.

The page server 194 counts the number of link selection hits 540 (in the aggregated server link traversal data 198) for all users that request pages from the page server 194 in a manner analogous to the browser 156 counting the number of link selection hits 540 for one user (in the client link traversal data 501).

If the determination at block 730 is false, then the current link that points at the current page was not received as a result of selection by a user of a child link embedded in a parent page of the current page, or the receipt of the link by the browser 156 (at block 705) does not represent a traversal of a path segment within a single domain, so control continues to block 799 where the logic of FIG. 7 returns.

If the determination at block 715 is false, then the current page is not a domain home page 420 or the previewing pages for the current page is not allowed, so control continues to block 730, as previously described above.

FIG. 8 depicts a flowchart of example processing for selecting descendant pages that meet a policy, according to an embodiment of the invention. Control begins at block 800. Control then continues to block 805 where the browser 156 finds the policy data 154 specified by the policy data identifier 430 that is associated with the user and the domain home page (the current page). The browser 156 further sets a current policy record to be the first policy record for the first preview window in the policy data 154 that is associated with the user and the domain home page (the current page).

Control then continues to block 810 where the browser 156 determines whether the policy type 630 in the current policy record specifies that current preview window should display the descendant page of the current page that is on a path in the domain from the current page that multiple users have most-frequently traversed (e.g., the current policy record specifies a policy type 630 of most frequent from server, as specified in the record 605 in FIG. 6).

If the determination at block 810 is true, then the policy type 630 specifies that the descendant page that is on a path (in the domain) most-frequently traversed by multiple users should be displayed, so control continues to block 815 where the browser 156 requests the aggregated server link traversal data 198 from the page server 194 of the server computer system 132. The page server 194 sends the requested aggregated server link traversal data 198 to the browser 156, and the browser 156 receives and saves the aggregated server link traversal data in the link traversal data 152.

Control then continues to block 820 where the browser 156 finds all paths (within the domain) from the current page to pages at the traversal level 605 if the traversal type 640 specifies a traversal to an exact number of levels (e.g., the record 605), or from the current page to a terminal page of the paths within the domain if the traversal type 640 specifies a complete path.

If the traversal type 640 specifies an exact number, then the browser 156 finds all paths (within the domain) from the current page through a number of levels specified by the traversal level 645. That is, the browser 156 finds all paths from the current page (the domain home page) through the traversal level 645 in the aggregated server link traversal data 198. If the traversal type 640 specifies a complete path, then the browser 156 finds all paths (within the domain) from the current page through the complete path. That is, the browser 156 finds all paths from the current page (the domain home page) through their terminal page (within the domain) in the aggregated server link traversal data 198.

The browser 156 finds the paths by finding pairs of records (representing path segments) in the aggregated server link traversal data 198 where the second page 535 in one record matches (is identical to) the first page 530 in another record. For example, the contents of the second page field 535 in the record 545 is identical to the contents of the first page field 530 in the record 550, so records 545 and 550 represent path segments that are connected and are part of the same path. Similarly, records 555 and 560 represent path segments that are connected and part of the same path. Further, records 565 and 570 represent path segments that are connected and are part of the same path.

A path is complete and the terminal page is found if the contents of the second page field 535 in a record is not identical to the contents of the first page field 530 in another record. For example, the contents of the second page field 535 in the record 550 is not in the first page field 530 of any record, so "inbox" is the terminal page in the path represented by the path segments of records 545 and 550, and path segments 545 and 550 represent a complete path within the portal domain. Similarly, "world news" in the second page 535 of the record 560 and "basketball" in the second page of record 570 represent terminal pages in their respective paths in the portal domain.

Control then continues to block 825 where the browser 156 determines the most-frequently traversed path from the current page by choosing at each level of the most-frequently traversed path, the link to the child page at the next level that has the largest number of link selections 540. For example, if the current page is the home page 205-1, then the aggregated server link traversal data 198-1 includes three records 545, 555, and 565, where the home page 205-1 is the first page in the path segment 530, indicating that the home page 198-1 has three embedded child links that have been selected. In order to determine the link from level zero to level one in the most-frequently traversed path starting at the home page 205-1, the browser 156 determines the embedded link in the current page that has the largest number of link selections 540, which, in this example, is represented by record 565 because 3,500,000 (field 540 in record 565)>2,490,000 (field 540 in record 555)>1,000,000 (field 540 in record 545). Thus, the most-frequently traversed path from the current page (the home page 205-1), in this example, includes the path segment of the home page 205-1 (level 0), the link 225-2, and the sports page 205-3 (level 1) because that path segment is represented by the record 565.

The browser 156 then determines the next segment in the most-frequently traversed path starting at the page at level one of the path segment that has already been determined, as described above. Thus, the browser finds all records in the aggregated server link traversal data 198-1 with the sports page 205-3 (the second page 535 of the previous segment) as the first page in the path segment 530, which is only the record 570. Since the record 570 is the only record with the sports page 205-3 as the first page 530, the path segment that includes the sports page 205-3, the link 225-5, and the basketball page 205-6 is also in the most-frequently traversed path.

The browser 156 then determines that the basketball page 205-6 is not found in the first page 530 in any of the records in the aggregated server link traversal data 198-1, so the browser 156 has found the complete most-frequently traversed path within the domain. The basketball page 205-6 includes an embedded link 225-9 to the basketball fan home page 205-11, which is in a different domain 196-2, so the basketball fan home page 205-11 is not included in the aggregated server link traversal data 198-1, so the basketball fan home page 205-11 is not considered for inclusion in the most-frequently traversed path from the home page 205-1 in the domain 196-1.

Thus, the browser 156 determines that the most-frequently traversed path is represented by the records 565 and 570, so the most-frequently traversed path includes the home page 205-1 (level 0), the link 225-2, the sports page 205-3 (level 1), the link 225-5, and the basketball page 205-6 (level 2).

Control then continues to block 830 where the browser 156 selects the descendant page from among the pages that are on the path from the current page to the descendant page that was most-frequently traversed by the multiple users, as compared to other found paths (found by block 820) from the current page to other descendant pages. If the traversal type 640 specifies an exact number of levels (e.g., the record 605), then the browser 156 selects the descendant page that is at the traversal level 645 on the most-frequently traversed path in the domain. If the traversal type specifies a complete path, then the browser 156 selects the descendant page that is a terminal page on the most-frequently-traversed path within its domain.

Using the example of record 605 in the policy data 154-1 of FIG. 6, the record 605 specifies selecting (for preview window "1") the descendant page of the current page that is on a path from the current page, is at a level 645 of "1" on the path, and the path that includes the descendant page is most-frequently accessed by multiple users. Thus, the path in the portal domain represented by the path segments of the records 565 and 570 is most-frequently traversed by multiple users, as explained above. The descendant page on the most-frequently traversed path represented by records 565 and 570 that is at level 1 is the page 205-3 ("sports"), which is represented as the second page 535 in the record 565. Thus, using the example of FIGS. 2, 3, 4, 5, and 6, at block 830, the browser 156 selects the page 205-3 as the descendant page associated with the policy record 605, which represents the policy for the preview window 315-1.

Control then continues to block 835 where the browser 156 retrieves the selected descendant page associated with the current policy record for the current preview window (the descendant page that is at an exact level or is a terminal page on the path most-frequently traversed by multiple users) from the server computer system 132.

Control then continues to block 840 where the browser 156 determines whether another policy record remains in the policy data 154 that is unprocessed by the logic of FIG. 8. If the determination at block 840 is false, then all records in the policy data 154 have been processed and all descendant pages for the preview windows that are specified by the policy data 154 as needing a descendant page have been selected and retrieved, so control continues to block 899 where the logic of FIG. 8 returns.

If the determination at block 840 is true, then not all records in the policy data 154 have been processed by the logic of FIG. 8, so control continues to block 865 where the browser 156 sets the current policy record to be the next unprocessed record in the policy data 154. Control then returns to block 810 where the browser 156 determines whether the policy type 630 for the current policy record specifies the descendant page on the most-frequently accessed path, as previously described above.

If the determination at block 810 is false, then the policy type 630 in the current policy record does not specify most frequent from server, so control continues to block 845 where the browser 156 determines whether the policy type 630 in the current policy record specifies selecting the descendant page that is on a path (in the domain) that is most-frequently traversed by the user at the client computer system 100. If the determination at block 845 is true, then the policy type 630 in the current policy record does specify selecting the descendant page that is on a path (in the domain) that is most-frequently traversed by the user at the client computer system 100, so control continues to block 820 where the browser 156 finds all paths (within the domain) from the current page to the traversal level 645 of the path if the traversal type 640 specifies a traversal to an exact number of levels, or from the current page to a terminal page of the path within the domain if the traversal type 640 specifies a complete path.

If the traversal type 640 specifies an exact number of levels, then the browser 156 finds all paths (within the domain) from the current page through the number of levels specified by the traversal level 645. That is, the browser 156 finds all paths from the current page (the domain home page) through the traversal level 645 in the client link traversal data 501. If the traversal type 640 specifies a complete path, then the browser 156 finds all paths (within the domain) from the current page through the complete path. That is, the browser 156 finds all paths from the current page (the domain home page) to their terminal page (within the domain) in the client link traversal data 501.

The browser 156 finds the paths by finding pairs of records (path segments) in the client link traversal data 501 where the second page 535 in one record matches (is identical to) the first page 530 in another record. For example, the contents of the second page field 535 in the record 505 are identical to the contents of the first page field 530 in the record 510, so records 505 and 510 represent path segments that are connected and are part of the same path. As another example, the contents of the second page field 535 in the record 515 are identical to the contents of the first page field 530 in the record 520, so records 515 and 520 represent path segments that are connected and are part of the same path.

A path is complete and the terminal page is found if the contents of the second page field 535 in a record are not identical (are different from) to the contents of the first page field 530 in all other records in the client link traversal data 501 for the domain. For example, the contents of the second page field 535 in the record 510 is not in the first page field 530 of any record, so "inbox" is the terminal page in the path represented by the path segments of records 505 and 510, and path segments 505 and 510 represent a complete path within the portal domain. Similarly, "world news" in the second page 535 of the record 520 and "sports" in the second page of record 525 represent terminal pages in their respective paths in the portal domain.

Control then continues to block 825 where the browser 156 determines the most-frequently traversed path from the current page by choosing at each level of the most-frequently traversed path, the link to the child page at the next level that has the largest number of link selections 540. For example, if the current page is the home page 205-1, then the client link traversal data 501 includes three records 505, 515, and 525, in which the home page 205-1 is the first page in the path segment 530, indicating that the home page 198-1 has three embedded child links that have been selected. In order to determine the link from level zero to level one in the most-frequently traversed path starting at the home page 205-1, the browser 156 determines the link with the largest number of link selections 540, which, in this example, is represented by record 505 because 25 (field 540 in record 505)>10 (field 540 in record 515)>9 (field 540 in record 525). Thus, the most-frequently traversed path from the current page (the home page 205-1), in this example, includes the path segment of the home page 205-1 (level 0), the link 225-1, and the mail page 205-2 (level 1) because that path segment is represented by the record 505.

The browser 156 then determines the next segment in the most-frequently traversed path starting at the page at level one of the path segment that has already been determined, as described above. Thus, the browser 156 finds all records in the client link traversal data 501 with the mail page 205-2 (the second page 535 of the previous segment) as the first page in the path segment 530, which is only the record 510. Since the record 510 is the only record with the mail page 205-2 as the first page 530, the path segment that includes the mail page 205-2, the link 225-4, and the inbox page 205-5 is also in the most-frequently traversed path.

The browser 156 then determines that the inbox page 205-5 is not found in the first page 530 in any of the records in the client link traversal data 501, so the browser 156 has found the complete most-frequently traversed path within the domain.

Thus, the browser 156 determines that the most-frequently traversed path is represented by the records 505 and 510, so the most-frequently traversed path includes the home page 205-1 (level 0), the link 225-1, the mail page 205-2 (level 1), the link 225-4, and the inbox page 205-5 (level 2).

Control then continues to block 830 where the browser 156 selects the descendant page on the path was most-frequently traversed by the user at the client computer system 100, as compared to other found paths (found by block 820) from the current page to other descendant pages. If the traversal type 640 specifies an exact number of levels, then the browser 156 selects the descendant page that is at the traversal level 645 on the most-frequently traversed path. If the traversal type specifies a complete path, then the browser 156 selects the descendant page that is a terminal page on the most-frequently traversed path within its domain.

Using the example of record 610 in the policy data 154-1 of FIG. 6, the record 610 specifies selecting (for preview window "2") the descendant page of the current page that is on a complete path from the current page (is at a terminal level of the complete path within the domain), and the path that includes the descendant page is most-frequently accessed by the user of the computer system 100. Thus, the path in the portal domain represented by the path segments of the records 505 and 510 is most-frequently accessed by the user, as previously described above. The descendant page on the path represented by records 505 and 510 that is a terminal page on a complete path within the portal domain is the page 205-5 ("inbox"), which is represented as the contents of the second page field 535 in the record 510. Thus, using the example of FIGS. 2, 3, 4, 5, and 6, at block 830, the browser 156 selects the page 205-5 as the descendant page associated with the policy record 610, which represents the policy for the preview window 315-2.

Control then continues to block 835 where the browser 156 retrieves the selected descendant page for the current policy record and the current preview window (the descendant page that is at an exact level or is a terminal page on the path most-frequently traversed by the user) from the server computer system 132. Control then continues to block 840, as previously described above.

If the determination at block 845 is false, then the policy type 630 of the current policy record is not the path most frequently-traversed by the user, so control continues to block 850, where the browser 156 determines whether the policy type 630 in the current policy record for the current preview window specifies a user tagged page.

If the determination at block 850 is true, then the policy type 630 specifies that the current preview window associated with the current policy record should display the user tagged page associated with the current domain, so control continues to block 855 where the browser 156 selects the descendant page as the user tagged page 440 in the record in the site data that is associated with the domain of the current page.

Control then continues to block 835 where the browser 156 retrieves the selected descendant page (the user tagged page) from the server computer system 132. Control then continues to block 840, as previously described above.

If the determination at block 850 is false, then the policy type 630 in the current policy record specifies that the current preview window should display the server tagged page, so control continues to block 860 where the browser 156 sets the selected descendant page to be the server tagged page 435 for the current domain of the current page. Control then continues to block 835 where the browser 156 retrieves the selected descendant page (the server tagged page) from the server computer system 132. Control then continues to block 840, as previously described above.

In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of records, entries, or organizations of data may be used. In addition, any data may be combined with logic, so that a separate data structure is not necessary. The previous detailed description is, therefore, not to be taken in a limiting sense, and the scope of the present invention is defined only by the appended claims.

In the previous description, numerous specific details were set forth to provide a thorough understanding of the invention. But, the invention may be practiced without these specific details. In other instances, well-known circuits, structures, and techniques have not been shown in detail in order not to obscure the invention.

What is claimed is:

1. A method comprising:
    receiving a link to a current page from a first user;
    in response to the receiving, displaying the current page on a display device;
    in response to the receiving, determining whether the current page is identical to a domain home page associated with the first user and whether the first user has specified that descendant pages are permitted to be displayed;
    if the current page is identical to the domain home page associated with the first user and the first user has specified that descendant pages are permitted to be displayed, selecting a first descendant page of the current page that meets a policy, wherein the selecting the first descendant page that meets the policy further comprises selecting the first descendant page from among a plurality of pages that are connected via a plurality of links embedded in the pages, wherein a first path from the current page to the first descendant page was most-frequently traversed among a plurality of paths, wherein the plurality of paths were traversed by a plurality of requests initiated by the first user, and wherein an address of the domain home page associated with the first user, the policy assigned to the first user and an indication whether the first user has specified that the descendant pages are permitted to be displayed are stored at a client computer that the first user uses to submit the link to the current page;

if the current page is identical to the domain home page associated with the first user and the first user has specified that descendant pages are permitted to be displayed, retrieving the first descendant page from a server;

if the current page is identical to the domain home page associated with the first user and the first user has specified that descendant pages are permitted to be displayed, displaying the first descendant page, wherein the first descendant page and the current page are simultaneously viewable;

if the current page is not identical to the domain home page associated with the first user, refraining from performing the selecting, the retrieving, and the displaying the first descendant page; and if the first user has not specified that descendant pages are permitted to be displayed, refraining from performing the selecting, the retrieving, and the displaying the first descendant page.

2. The method of claim 1, further comprising:
determining that a preview indicator is on, wherein the preview indicator is associated with the current page and with the first user.

3. The method of claim 1, wherein each of the plurality of paths comprises an alternating sequence of a subset of the pages and of the links, and wherein each of the links in the alternating sequence is incident to two of the pages that precede and follow the respective link in the alternating sequence, and wherein each of the plurality of requests selected a respective one of the links in the alternating sequence.

4. The method of claim 3, further comprising:
calculating a number of traversals of each of the plurality of paths by the requests initiated by the first user.

5. The method of claim 1, wherein the selecting the first descendant page that meets the policy further comprises:
selecting the first descendant page from among the plurality of pages that are connected via the plurality of links embedded in the pages, wherein the first path from the current page to the first descendant page was most-frequently traversed among the plurality of paths, wherein the plurality of paths were traversed by the plurality of requests initiated by a plurality of users.

6. The method of claim 1, wherein the selecting the first descendant page that meets the policy further comprises:
selecting the first descendant page that is at a level specified by the policy, wherein the level is on a path from the current page to the first descendant page.

7. A method for deploying computing services, comprising:
integrating computer readable code into a computer system, wherein the code in combination with the computer system performs the method of claim 1.

8. A computer-readable storage medium encoded with instructions, wherein the instructions when executed comprise:
receiving a link that points at a current page from a user;

in response to the receiving, retrieving the current page from a server;

displaying the current page on a display device;

in response to the receiving, determining whether the current page is identical to a domain home page associated with the user and whether the user has specified that descendant pages are permitted to be displayed;

if the current page is identical to the domain home page associated with the user and the user has specified that descendant pages are permitted to be displayed, selecting a first descendant page of the current page in a same domain as the current page, wherein the first descendant page meets a policy, and wherein the first descendant page is a descendant of the current page, wherein the policy is associated with the domain, wherein the selecting the first descendant page that meets the policy further comprises selecting the first descendant page from among a plurality of pages that are connected via a plurality of links embedded in the pages, wherein a first path from the current page to the first descendant page was most-frequently traversed among a plurality of paths, wherein the plurality of paths were traversed by a plurality of requests initiated by the user, and wherein an address of the domain home page associated with the user, the policy assigned to the user and an indication whether the user has specified that the descendant pages are permitted to be displayed are stored at a client computer that the user uses to submit the link to the current page;

if the current page is identical to the domain home page associated with the user and the user has specified that descendant pages are permitted to be displayed, retrieving the first descendant page;

if the current page is identical to the domain home page associated with the user and the user has specified that descendant pages are permitted to be displayed, determining a preview window specified by the policy;

if the current page is identical to the domain home page associated with the user and the user has specified that descendant pages are permitted to be displayed, displaying the first descendant page in the preview window, wherein the first descendant page and the current page are simultaneously viewable;

if the current page is not identical to the domain home page associated with the user, refraining from performing the selecting, the retrieving, the determining the preview window, and the displaying the first descendant page; and if the user has not specified that descendant pages are permitted to be displayed, refraining from performing the selecting, the retrieving, the determining the preview window, and the displaying the first descendant page.

9. The computer-readable storage medium of claim 8, wherein each of the plurality of paths comprises an alternating sequence of a subset of the pages and of the links, and wherein each of the links in the alternating sequence is incident to two of the pages that precede and follow the respective link in the alternating sequence, and wherein each of the plurality of requests selected a respective one of the links in the alternating sequence.

10. The computer-readable storage medium of claim 9, further comprising:
deciding that the first path was most-frequently traversed, wherein the deciding further comprises choosing the link at each level of the first path that has a largest number of link selections at the respective level.

11. The computer-readable storage medium of claim 8, wherein the selecting the first descendant page that meets the policy further comprises:

selecting the first descendant page from among the plurality of pages that are connected via the plurality of links embedded in the pages, wherein the first path from the current page to the first descendant page was most-frequently traversed among the plurality of paths, wherein the plurality of paths were traversed by the plurality of requests initiated by a plurality of users.

12. The computer-readable storage medium of claim 8, wherein the selecting the first descendant page that meets the policy further comprises:

selecting the first descendant page that is a terminal page of a path from the current page to the first descendant page within the domain.

13. The computer-readable storage medium of claim 8, wherein the selecting the first descendant page that meets the policy further comprises:

determining that the policy indicates that the first descendant page is specified by the server; and selecting the first descendant page that is specified by the server.

14. The computer-readable storage medium of claim 8, wherein the selecting the first descendant page that meets the policy further comprises:

determining that the policy indicates that the first descendant page was specified by the user; and selecting the first descendant page that was specified by the user.

15. A computer system comprising:

a processor; and memory connected to the processor, wherein the memory encodes instructions that when executed by the processor comprise:

receiving a link that points at a current page from a first user, in response to the receiving, retrieving the current page from a server, displaying the current page, in response to the receiving, determining whether the current page is identical to a domain home page associated with the first user and whether the first user has specified that descendant pages are permitted to be displayed, if the current page is identical to the domain home page associated with the first user and the first user has specified that descendant pages are permitted to be displayed, selecting a first descendant page of the current page in a same domain as the current page, wherein the first descendant page meets a policy, and wherein the first descendant page is a descendant of the current page, wherein the policy is associated with the domain, wherein the selecting the first descendant page that meets the policy further comprises selecting the first descendant page from among a plurality of pages that are connected via a plurality of links embedded in the pages, wherein a first path from the current page to the first descendant page was most-frequently traversed among a plurality of paths, wherein the plurality of paths were traversed by a plurality of requests initiated by the first user, and wherein an address of the domain home page associated with the first user, the policy assigned to the first user and an indication whether the first user has specified that the descendant pages are permitted to be displayed are stored at a client computer that the first user uses to submit the link to the current page, if the current page is identical to the domain home page associated with the first user and the first user has specified that descendant pages are permitted to be displayed, retrieving the first descendant page, if the current page is identical to the domain home page associated with the first user and the first user has specified that descendant pages are permitted to be displayed, determining a preview window specified by the policy, and policy, if the current page is identical to the domain home page associated with the first user and the first user has specified that descendant pages are permitted to be displayed, displaying the first descendant page in the preview window, wherein the first descendant page and the current page are simultaneously viewable, if the current page is not identical to the domain home page associated with the first user, refraining from performing the selecting, the retrieving, the determining the preview window, and the displaying the first descendant page, and if the first user has not specified that descendant pages are permitted to be displayed, refraining from performing the selecting, the retrieving, the determining the preview window, and the displaying the first descendant page.

16. The computer system of claim 15, wherein the selecting the first descendant page that meets the policy further comprises:

selecting the first descendant page from among the plurality of pages that are connected via the plurality of links embedded in the pages, wherein the first path from the current page to the first descendant page was most-frequently traversed among the plurality of paths, wherein the plurality of paths were traversed by the plurality of requests initiated by a plurality of users.

17. The computer system of claim 15, wherein the selecting the first descendant page that meets the policy further comprises:

determining that the policy indicates that the first descendant page is specified by the server; and selecting the first descendant page that is specified by the server.

* * * * *